United States Patent
Yu et al.

(10) Patent No.: US 7,315,185 B2
(45) Date of Patent: Jan. 1, 2008

(54) LOW VOLTAGE DIFFERENTIAL SIGNAL RECEIVER AND METHODS OF CALIBRATING A TERMINATION RESISTANCE OF A LOW VOLTAGE DIFFERENTIAL SIGNAL RECEIVER

(75) Inventors: Jae-Suk Yu, Seoul (KR); Jae-Youl Lee, Gyeonggi-do (KR); Jong-Seon Kim, Gyeonggi-do (KR); Kyung-Suc Nah, Seoul (KR)

(73) Assignee: Samsung Electronics Co., Ltd. (KR)

( * ) Notice: Subject to any disclaimer, the term of this patent is extended or adjusted under 35 U.S.C. 154(b) by 72 days.

(21) Appl. No.: 11/434,960

(22) Filed: May 16, 2006

(65) Prior Publication Data

US 2007/0018686 A1 Jan. 25, 2007

(30) Foreign Application Priority Data

Jul. 13, 2005 (KR) .................... 10-2005-0063323

(51) Int. Cl.
*H03K 17/16* (2006.01)
(52) U.S. Cl. .......................................... 326/83; 326/30
(58) Field of Classification Search .............. 326/30; 327/51, 52, 54
See application file for complete search history.

(56) References Cited

U.S. PATENT DOCUMENTS 7,176,709 B2* 2/2007 Uematsu .................... 326/30

2003/0107411 A1* 6/2003 Martin et al. .............. 327/100

FOREIGN PATENT DOCUMENTS

| JP | 2003-008421 | 1/2003 |
| JP | 10-2003-298395 | 10/2003 |

OTHER PUBLICATIONS

Notice to Submit a Response for Korean Application No. 10-2005-0063323, mailed Aug. 31, 2006.

* cited by examiner

*Primary Examiner*—Rexford Barnie
*Assistant Examiner*—Thienvu Tran
(74) *Attorney, Agent, or Firm*—Myers Bigel Sibley & Sajovec, PA

(57) ABSTRACT

A low voltage differential signal (LVDS) receiver includes a first receiving unit configured to receive a reference voltage and to responsively generate a first differential signal, and a second receiving unit configured to receive a voltage developed across a variable termination resistor unit having a resistance that is adjustable based on a resistance control code in response to a reference current, and to responsively generate a second differential signal. The LVDS receiver further includes a comparing unit configured to compare the first differential signal with the second differential signal and to responsively generate a counter control signal. The LVDS receiver further includes an up/down counter configured to adjust the resistance control code in response to the counter control signal. The up/down counter is further configured to provide the resistance control code to the variable termination resistor unit. Corresponding methods are also disclosed.

20 Claims, 5 Drawing Sheets

LOW VOLTAGE DIFFERENTIAL SIGNAL RECEIVER AND METHODS OF CALIBRATING A TERMINATION RESISTANCE OF A LOW VOLTAGE DIFFERENTIAL SIGNAL RECEIVER

CROSS-REFERENCE TO RELATED APPLICATION

This application claims priority under 35 U.S.C. § 119(a) to Korean Patent Application No. 10-2005-0063323 filed on Jul. 13, 2005, the disclosure of which is incorporated herein by reference in its entirety.

FIELD OF THE INVENTION

The present invention relates to a low voltage differential signal (LVDS) receiver. More particularly, the present invention relates to an LVDS receiver with a termination resistor therein, and to methods of setting a resistance of the termination resistor.

BACKGROUND

Low voltage differential signal (LVDS) interface systems capable of operating with high speed, low power consumption and/or low electromagnetic interference (EMI) characteristics are used in various applications, such as semiconductor devices, liquid crystal displays, communication systems, and the like.

FIG. 1 is a circuit diagram illustrating a conventional interface system 10 using low voltage differential signals.

Referring to FIG. 1, the conventional interface system 10 using low voltage differential signals includes an LVDS driver 20 and an LVDS receiver 30. The LVDS driver 20 generates an LVDS pair with a first signal Vin1 and a second signal Vin2, which is an inverted signal from the first signal Vin1. The LVDS receiver 30 includes a receiving unit 31 that reconstructs the first signal by detecting a voltage difference between received signals.

The LVDS driver 20 and the LVDS receiver 30 may respectively be formed as integrated chips, and a termination resistor $R_L$ may be attached as an external element between the LVDS driver 20 and the LVDS receiver 30.

The LVDS driver 20 includes a current source 21 for supplying a given amount, for example, about 3.5 mA, of current, and first, second, third and fourth transistors M10, M20, M30 and M40.

When a level of the first signal Vin1 is low and a level of the second signal Vin2 is high, the first transistor M10 and the fourth transistor M40 are turned on, and current flows in one direction through the termination resistor $R_L$. On the other hand, when a level of the first signal Vin1 is high and a level of the second signal Vin2 is low, the second transistor M20 and the third transistor M30 are turned on, and the current flows in the opposite direction through the termination resistor $R_L$.

Low voltage differential signals appear at each end of the termination resistor $R_L$. A voltage developed across the termination resistor $R_L$ may be about 350 mV when the current supplied by the current source 21 is about 3.5 mA and the resistance of the termination resistor $R_L$ is about 100 ohms.

The low voltage differential signals produce a voltage across the termination resistor $R_L$ in front of the LVDS receiver 30. Therefore, the termination resistor $R_L$ may be used in constructing a conventional interface system 10 using low voltage differential signals.

Conventionally, termination resistors are added as external elements to the LVDS receiver. The external termination resistors may maintain the accuracy of the received signals within a range of about 1%. In contrast, termination resistors that are formed integral to an LVDS receiver (e.g. on the same integrated chip as the LVDS receiver 30) may typically maintain the accuracy of the received signals in a range of about 20%. Thus, it has generally been advantageous to use external termination resistors instead of integrated termination resistors.

External termination resistors have some drawbacks, however. For example, while an LVDS driver or receiver may be implemented as an integrated circuit inside a chip, the external termination resistors are not implemented inside the chip, which may impair signal accuracy due to impedance mismatches and/or bad hardwiring. An interface system with external termination resistors may cause distorted signals to be applied to the LVDS receiver, and/or may have poor jitter characteristics.

Furthermore, external termination resistors are typically installed on a printed circuit board (PCB) one by one, resulting in high manufacturing costs and/or complicating the manufacturing process. The more signal transfer channels the interface 10 has, the greater the problems become.

In addition, because the resistances of the external termination resistors are fixed, if the resistances need to be adjusted, the external termination resistors may be replaced with new external termination resistors one by one.

As discussed above, external termination resistors may have performance limitations, high costs, and/or complex installation processes, and the resistances of external termination resistors may not be easily adjusted.

Internal termination resistors integrated with an LVDS receiver have been used to address some of these drawbacks. However, internal termination resistors may suffer significant degradation in signal accuracy.

SUMMARY

A low voltage signal (LVDS) receiver according to some embodiments of the invention includes a first receiving unit configured to receive a reference voltage and to responsively generate a first signal, and a second receiving unit configured to receive a voltage developed across a variable termination resistor unit having a resistance that is adjustable based on a resistance control code in response to a reference current, and to responsively generate a second signal. The LVDS receiver further includes a comparing unit configured to compare the first signal with the second signal and to responsively generate a counter control signal. The LVDS receiver further includes an up/down counter configured to adjust the resistance control code in response to the counter control signal. The up/down counter is further configured to provide the resistance control code to the variable termination resistor unit.

The reference voltage may have a voltage level approximately equal to a low voltage signal. The reference voltage may be provided from an external voltage source, and/or the LVDS receiver may include a voltage source configured to generate the reference voltage and to provide the reference voltage to the first receiving unit.

The reference current may be substantially equal to a value of the reference voltage divided by a desired resistance value of the variable termination resistor unit. The reference current may be provided from an external current source, and/or the LVDS receiver may include a current source configured to generate the reference current and to provide the reference current to the first receiving unit.

The first receiving unit, the second receiving unit, the variable termination resistor unit, the comparing unit and the up/down counter may be implemented in a single integrated chip.

The LVDS receiver may further include a summing unit configured to combine the first signal and the second signal, configured to responsively generate a third signal containing information of the first and second signals, and configured to provide the third signal to the comparing unit.

The comparing unit may be configured to generate a first counter control signal, in response to the second signal being smaller than the first signal, that controls the up/down counter so that the voltage across the variable termination resistor unit increases. The comparing unit may be further configured to generate a second counter control signal, in response to the second signal being larger than the first signal, that controls the up/down counter so that the voltage across the variable termination resistor unit decreases.

The counter control signal may be configured to decrease the resistance control code when the second signal is smaller than the first signal, and the counter control signal may be configured to increase the resistance control code in response to the second signal being larger than the first signal.

The variable termination resistor unit may include multiple MOS transistors that are coupled in parallel to one another, and that are configured to respectively turn on or off in response to a respective bit of the resistance control code. Respective ones of the multiple MOS transistors may have different effective resistances.

The variable termination resistor may be configured such that its resistance decreases as the resistance control code increases and increases as the resistance control code decreases.

The LVDS receiver may further include a latch configured to store the resistance control code. The latch may be configured to store the resistance control code when the resistance of the variable termination resistor unit has settled.

The LVDS receiver may further include a first pad and a second pad configured to connect the variable termination resistor unit to an external connector. The LVDS receiver may further include a third pad and a fourth pad configured to connect the second receiving unit to a second external connector, the third pad and the fourth pad being electrically connected to the first pad and the second pad, respectively. The second receiving unit may be presented with a total voltage across the variable termination resistor unit, the first pad and the second pad.

The LVDS receiver may further include a fifth pad and a sixth pad configured to connect the first receiving unit with an external connector.

Methods of calibrating a termination resistance of an LVDS receiver according to some embodiments of the invention include sensing a reference voltage level, sensing a voltage developed across a variable termination resistor in response to a reference current, and adjusting a resistance of the variable termination resistor so that the voltage across the variable termination resistor approaches the reference voltage, in response to a result from a comparison between the reference voltage and the voltage across the variable termination resistor.

The methods may further include generating a first signal in response to the reference voltage, and generating a second signal in response to the voltage across the variable termination resistor. The first and the second signals may be combined before the comparison. The reference current may have a value equal to a voltage level of the reference voltage divided by a desired resistance value for the variable termination resistor.

Adjusting a resistance of the variable termination resistor may include comparing the reference voltage with the voltage across the variable termination resistor, and causing the resistance of the variable termination resistor to be decreased or to be increased, according to whether the voltage across the variable termination resistor is larger or smaller than the reference voltage.

The methods may further include decreasing the resistance control code in response to the voltage across the variable termination resistor being smaller than the reference voltage, and increasing the resistance control code in response to the voltage across the variable termination resistor being larger than the reference voltage.

The methods may further include storing the resistance control code once the voltage across the variable termination resistor has settled on the reference voltage.

BRIEF DESCRIPTION OF THE DRAWINGS

The above and other features and advantages of the present invention will become more apparent by describing in detail example embodiments thereof with reference to the accompanying drawings, in which.

DETAILED DESCRIPTION OF EMBODIMENTS OF THE INVENTION

Figure 1:
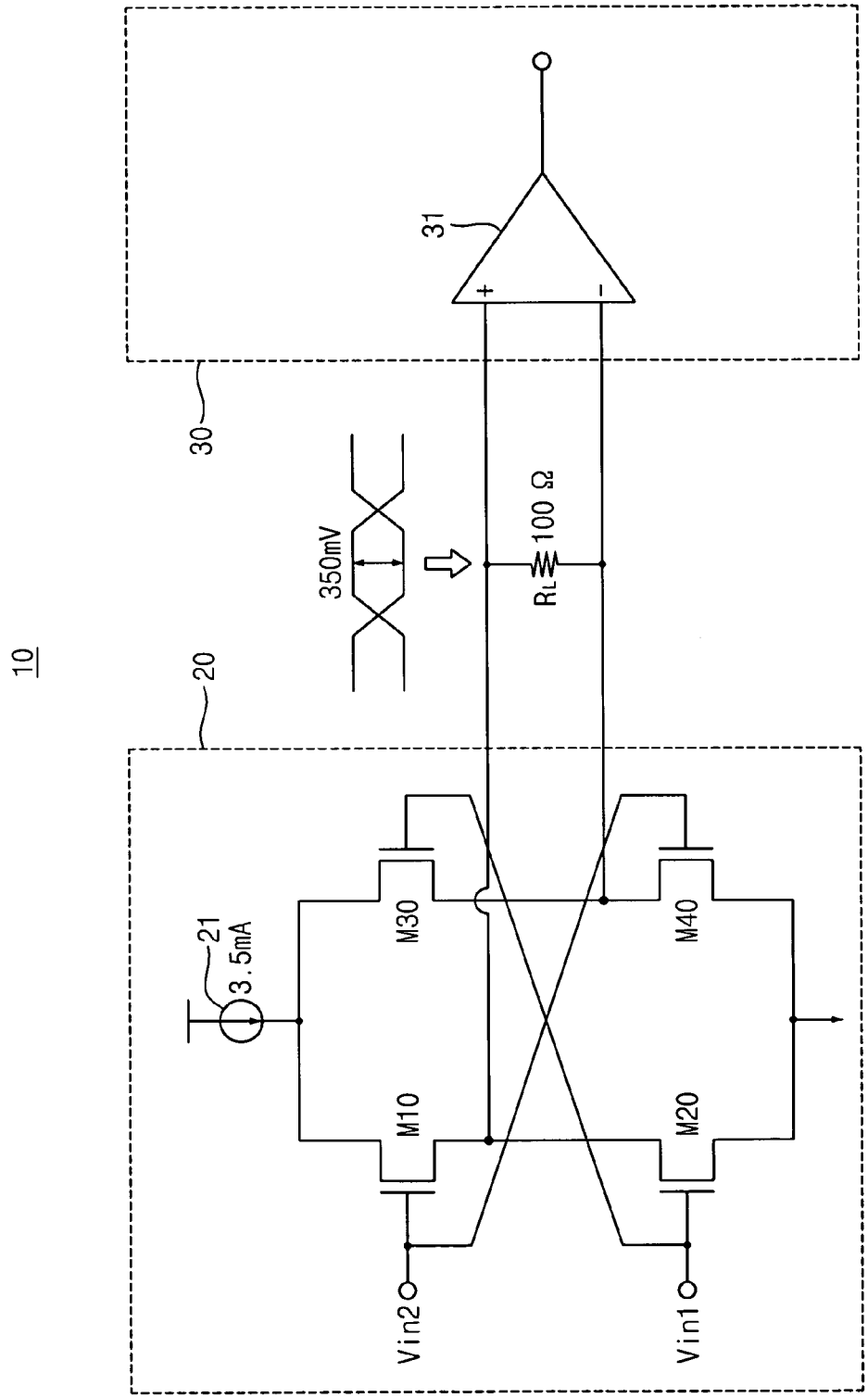
FIG. 1 is a circuit diagram illustrating a conventional interface system using low voltage differential signals.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

Figure 2:
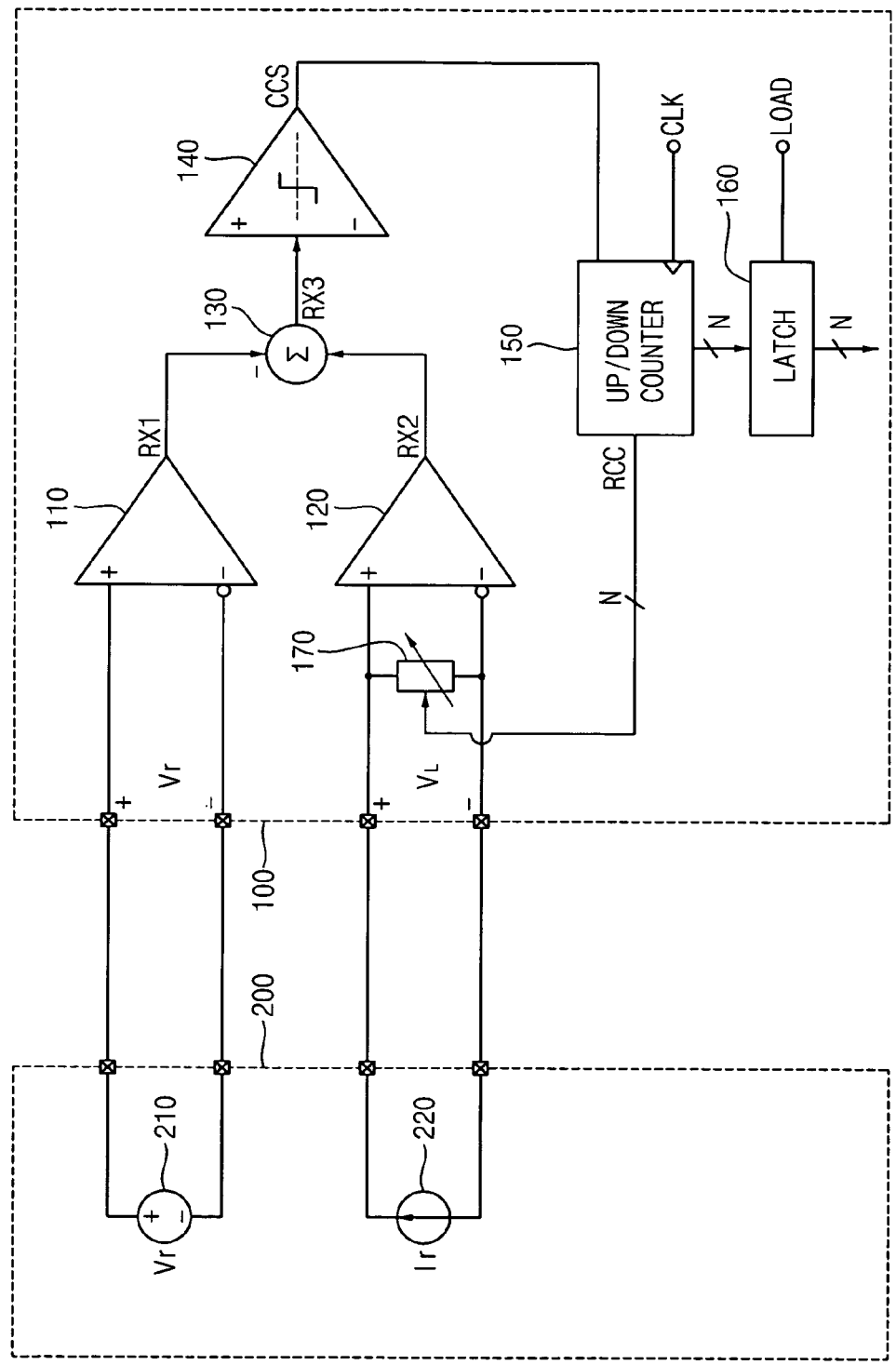
FIG. 2 is a circuit diagram illustrating a low voltage differential signal (LVDS) receiver according to some embodiments of the present invention.

FIG. 2 is a circuit diagram illustrating a low voltage differential signal (LVDS) receiver 100 according to some embodiments of the present invention.

Referring to FIG. 2, the LVDS receiver 100 includes a first receiving unit 110, a second receiving unit 120, a summing unit 130, a comparing unit 140, an up/down counter 150, a latch 160 and a variable termination resistor unit 170. An LVDS receiver 100 according to some embodiments of the invention may be implemented on a single integrated circuit (IC) and/or on multiple ICs.

The first receiving unit 110 receives a reference voltage Vr provided from a voltage source 210 and responsively generates a first differential signal RX1, which is an analog signal.

The reference voltage Vr, supplied by the voltage source 210, represents a voltage level of a low voltage differential signal assuming an idealized case. The voltage source 210 may be provided outside of the LVDS receiver 100 in an external chip 200 as in FIG. 2, and/or may be integrated with the LVDS receiver 100. The voltage source 210 may use the system's power to generate the reference voltage Vr, when integrated with the LVDS receiver 100.

The second receiving unit 120 receives a reference current Ir provided from a current source 220 and responsively generates a second differential signal RX2, which is an analog signal, from a voltage $V_L$ developed across the variable termination resistor unit 170 in response to the reference current Ir.

The reference current Ir supplied by the current source 220 represents a current for which the voltage $V_L$ across the variable termination resistor unit 170 maintains substantially the same level as the reference voltage Vr, when a resistance $R_L$ of the variable termination resistor unit 170 is set at an appropriate level. That is, with the appropriate resistance $R_L$ of the variable termination resistor unit 170, a product of the reference current Ir and the resistance $R_L$ of the variable termination resistor unit 170 is approximately equal to the reference voltage Vr.

The current source 220 may be provided outside of the LVDS receiver 100 in an external chip 200 as in FIG. 2, but may also be integrated with the LVDS receiver 100. The current source 220 may use the system's power to generate the reference current Ir, when integrated with the LVDS receiver 100.

The summing unit 130 receives the first differential signal RX1 from the first receiving unit 110 and the second differential signal RX2 from the second receiving unit 120. The summing unit 130 combines the first and the second differential signals and responsively generates a third differential signal RX3, which is an analog signal. The third differential signal RX3 contains information of the first and the second differential signals.

The comparing unit 140 receives the third differential signal RX3 and compares the first differential signal RX1 with the second differential signal RX2 and responsively generates a counter control signal CCS for controlling the up/down counter 150. The counter control signal CCS may include a signal to decrease the counter when the second differential signal RX2 is smaller than the first differential signal RX1, and a signal to increase the counter when the second differential signal RX2 is larger than the first differential signal RX1.

For example, when the second differential signal RX2 is smaller than the first differential signal RX1, the comparing unit 140 generates a logic '0' as the counter control signal CCS. Otherwise, the comparing unit 140 generates a logic '1' as the counter control signal CCS.

The up/down counter 150 increases or decreases a resistance control signal, such as an N-bit resistance control code RCC, in response to the counter control signal CCS provided by the comparing unit 140. The N-bit resistance control code RCC is provided to the variable termination resistor unit 170 for controlling the resistance $R_L$ of the variable termination resistor unit 170. For example, when the counter control signal CCS is a logic '1' value and the resistance control code RCC increases, the resistance $R_L$ decreases. Otherwise, when the counter control signal CCS is a logic '0' value and the resistance control code RCC decreases, the resistance $R_L$ increases.

The up/down counter 150 may decrease the resistance control code RCC by 1 bit for each clock cycle in response to the counter control signal CCS having a logic '0' value. Similarly, the up/down counter 150 may increase the resistance control code RCC by 1 bit for each clock cycle in response to the counter control signal CCS having a logic '1' value. The resistance control code RCC may be a 3-bit code. A system clock signal in the interface system may be used in the operation of the up/down counter 150.

The latch 160 stores the resistance control code RCC set at the up/down counter 150. The latch 160 may hold the resistance control code RCC when the resistance $R_L$ of the variable termination resistor unit 170 has settled. The resistance control code RCC stored in the latch 160 may be used as a provisional resistance control code RCC without calibrating the resistance $R_L$ of the variable termination resistor unit 170. Operations related to the latch 160 will be discussed in more detail below.

The variable termination resistor unit 170 has a resistance $R_L$ that is adjusted in response to the resistance control code RCC provided from the up/down counter 150. The variable termination resistor unit 170 may include switches and/or a plurality of transistors and/or resistors coupled in parallel to each other.

Figure 3:
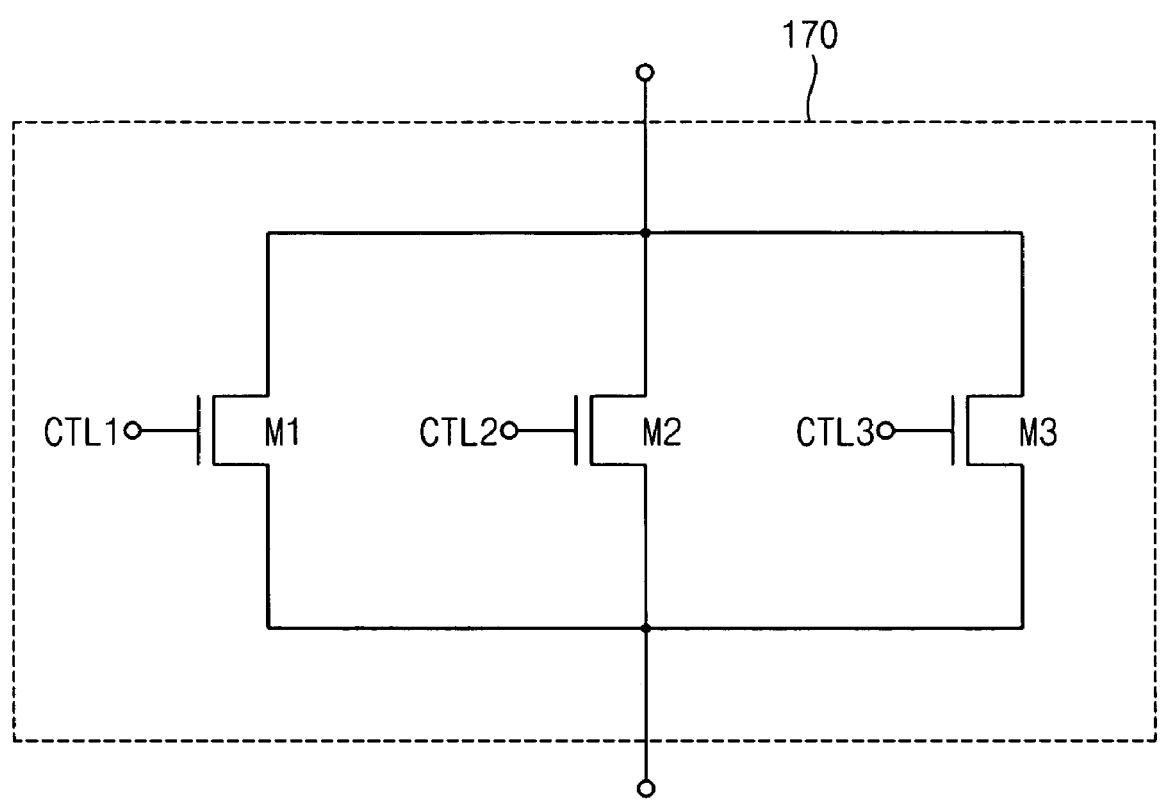
FIG. 3 is a circuit diagram illustrating a variable termination resistor unit according to some embodiments of the invention including multiple transistors.

FIG. 3 is a circuit diagram illustrating a variable termination resistor unit according to some embodiments of the invention implemented with multiple transistors. It will be understood, however, that other implementations of a variable termination resistor unit 170 are possible.

Referring to FIG. 3, the variable termination resistor unit 170 includes first to third MOS transistors M1, M2 and M3 connected in parallel to one another.

The resistance control code RCC contains an upper bit CTL1, a middle bit CTL2 and a lower bit CTL3. The first MOS transistor M1 is activated by the upper bit CTL1, while the second MOS transistor M2 is activated by the middle bit CTL2, and the third MOS transistor M3 is activated by the lower bit CTL3. For example, when the resistance control code RCC is 101, the first and the third MOS transistors may be turned on, while the second MOS transistor may be turned off.

Because the resistance $R_L$ of the variable termination resistor unit 170 may be smallest when all of the MOS transistors M1, M2 and M3 are turned on, the resistance control code RCC may be initialized to '111', so as to turn on all of the MOS transistors M1, M2 and M3. During operation, the resistance control code RCC may be gradually decreased, and the MOS transistors in the variable termination resistor unit 170 may be turned off one by one in response, so that the resistance $R_L$ may gradually increase to an appropriate value.

In other embodiments, the MOS transistors M1, M2 and M3 may be activated by a negative logic resistance control code. Thus, the resistance control code RCC may be initialized as '000' before being gradually increased.

The MOS transistors M1, M2 and M3 may have different resistances. For example, the first MOS transistor M1 under control of the upper bit CTL1 may have the largest resistance, and the third MOS transistor M3 under control of the lower bit CTL3 may have the smallest resistance. The second MOS transistor M2 under control of the middle bit CTL2 may have a resistance that is intermediate the resistances of the first MOS transistor M1 and the third MOS transistor M3. The variable termination resistor unit 170 may be configured such that its resistance may be adjusted in other ways.

The hardware configurations of the LVDS receiver 100 described above may be able to set the resistance $R_L$ of the variable termination resistor unit 170 implemented at the second receiving unit 120 to an appropriate value. Operations of the LVDS receiver 100 will be discussed in detail below.

Figure 4:
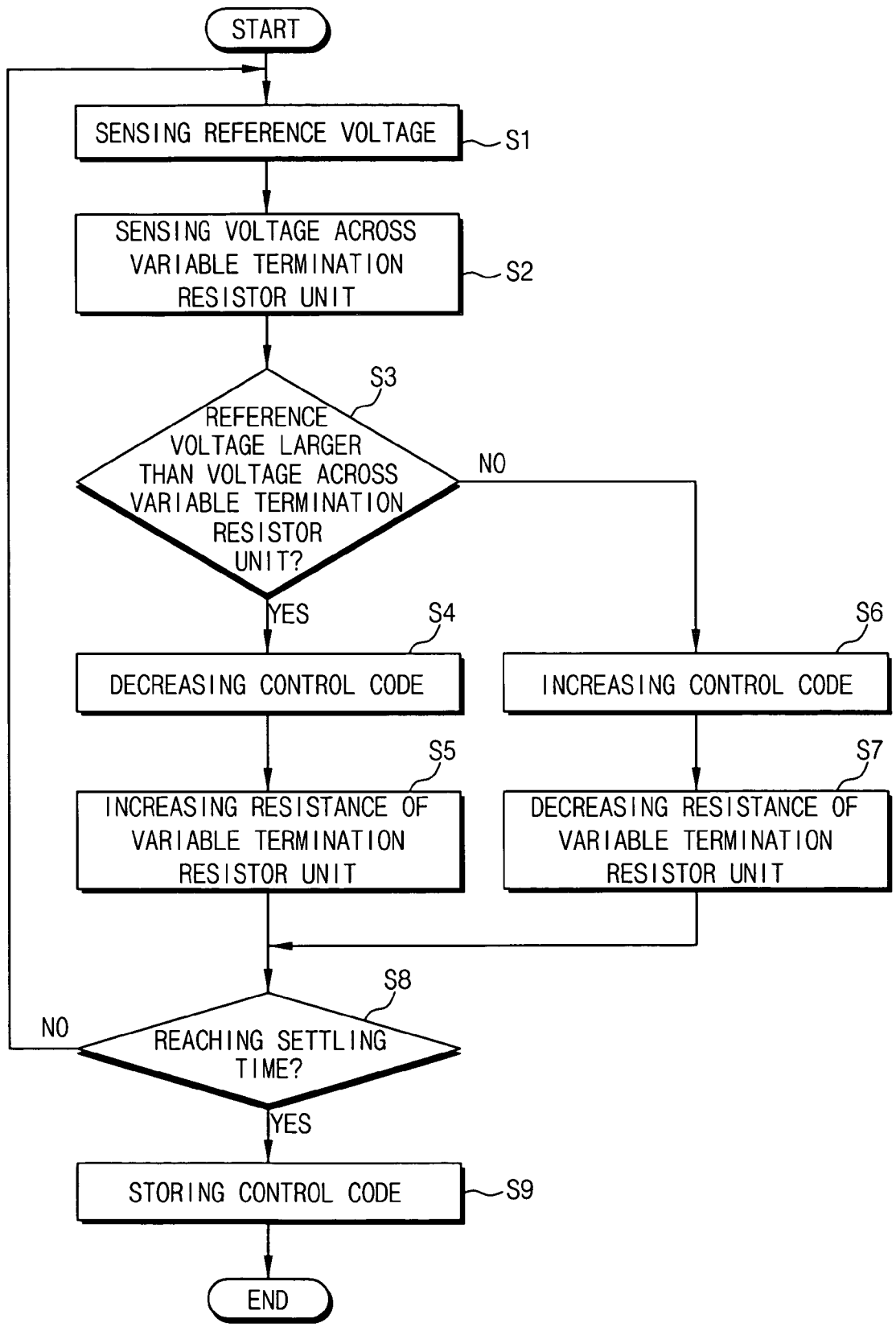
FIG. 4 is a flow chart illustrating operations of an LVDS receiver according to some embodiments of the invention.

FIG. 4 is a flow chart illustrating operations of an LVDS receiver 100 according to some embodiments of the invention.

Referring to FIG. 4, when the reference voltage Vr is provided from the voltage source 210, the first receiving unit 110 detects the reference voltage Vr (Block S1). The first receiving unit 110 generates the first differential signal RX1 in response to the reference voltage Vr. The second receiving unit 120 detects the voltage $V_L$ across the variable termination resistor unit 170 generated by the reference current Ir, which is provided from the current source 220 (Block S2). The second receiving unit 120 generates the second differential signal RX2 in response to the voltage $V_L$ across the variable termination resistor unit 170.

The first and the second differential signals RX1 and RX2 generated by the first and second receiving units 110 and 120 are combined by the summing unit 130, which responsively generates the third differential signal RX3. The third differential signal RX3 is provided to the comparing unit 140.

The first differential signal RX1 is compared with the second differential signal RX2 in the comparing unit 140 (Block S3).

If the voltage $V_L$ across the variable termination resistor unit 170 is smaller than the reference voltage Vr, then the second differential signal RX2 may be weaker than the first differential signal RX1.

In that case, the counter control signal CCS from the comparing unit 140 will be set at 0, so as to cause the up/down counter 150 to decrease the resistance control code RCC, which in turn may increase the resistance $R_L$ of the variable termination resistor unit 170 (Block S4). The voltage $V_L$ across the variable termination resistor unit 170 is increased to approach the reference voltage Vr.

The up/down counter 150 may decrease the resistance control code RCC by one bit in each clock cycle in which the counter control signal CCS is set at 0, and the resistance $R_L$ may increase in response to the resistance control code RCC being decreased by one bit (Block S5).

If the voltage $V_L$ across the variable termination resistor unit 170 is larger than the reference voltage Vr, the second differential signal RX2 may be stronger than the first differential signal RX1.

In that case, the counter control signal CCS from the comparing unit 140 may be set at 1, so as to cause the up/down counter 150 to increase the resistance control code RCC, which will operate to decrease the resistance $R_L$ of the variable termination resistor unit 170 (Block S6). The voltage $V_L$ across the variable termination resistor unit 170 decreases to approach the reference voltage Vr.

The up/down counter 150 may increase the resistance control code RCC by one bit in each clock cycle in which the counter control signal CCS is set at 1, and the resistance of the variable termination resistor unit 170 may decrease in response to the resistance control code RCC (Block S7) being increased.

By repeating block S1 to block S7, the resistance $R_L$ may be gradually changed, and the voltage $V_L$ across the variable termination resistor unit 170 may gradually approach the reference voltage Vr, until the voltage $V_L$ is substantially equal to the reference voltage Vr. After a predetermined settling time, during which the voltage $V_L$ approaches close enough to the reference voltage Vr, the resistance $R_L$ may be within an acceptable range (Block S8).

The latch 160 stores a value of the resistance control code RCC when the resistance $R_L$ is acceptable, e.g., when the voltage $V_L$ approaches closest to the reference voltage Vr (Block S9).

The resistance control code RCC stored in the latch 160 may be used later as a provisional resistance control code for setting a resistance of the variable termination resistor unit 170 when the LVDS receiver 100 operates without calibration.

After the calibration operations described above, the LVDS receiver 100 may receive LVDS communications using the second receiving unit 120 and the variable termination resistor unit 170. According to some embodiments of the present invention, the resistance $R_L$ may be set initially at the smallest possible value. The resistance $R_L$ may be gradually increased through the operations described above until the voltage $V_L$ becomes substantially equal to the reference voltage Vr.

The resistance control code RCC generated by the up/down counter 150 may initially decrease, and then may alternatingly increase and decrease once the voltage $V_L$ approaches the reference voltage Vr, because the voltage $V_L$ may be close to but not the same as the reference voltage Vr. A settling time for the calibration of the resistance $R_L$ may be provided at least until the resistance control code RCC alternately increases and decreases.

The calibration operations described above may be performed once in a power-on mode and/or a sleep mode of the system. After the calibration operations, the resistance control code RCC stored in the latch 160 may be retrieved and used without further calibration.

As described above, some embodiments of the invention include a variable termination resistor inside an LVDS receiver. The resistance of the variable termination resistor may be calibrated according to a reference voltage Vr.

However, when an LVDS receiver 100 is packaged as an integrated chip, the package may have bump contact resistances at pads. It may be desirable to take such resistances into consideration during the calibration operations. Accordingly, some embodiments of the invention take the contact resistance at the pads of the package into account.

Figure 5:
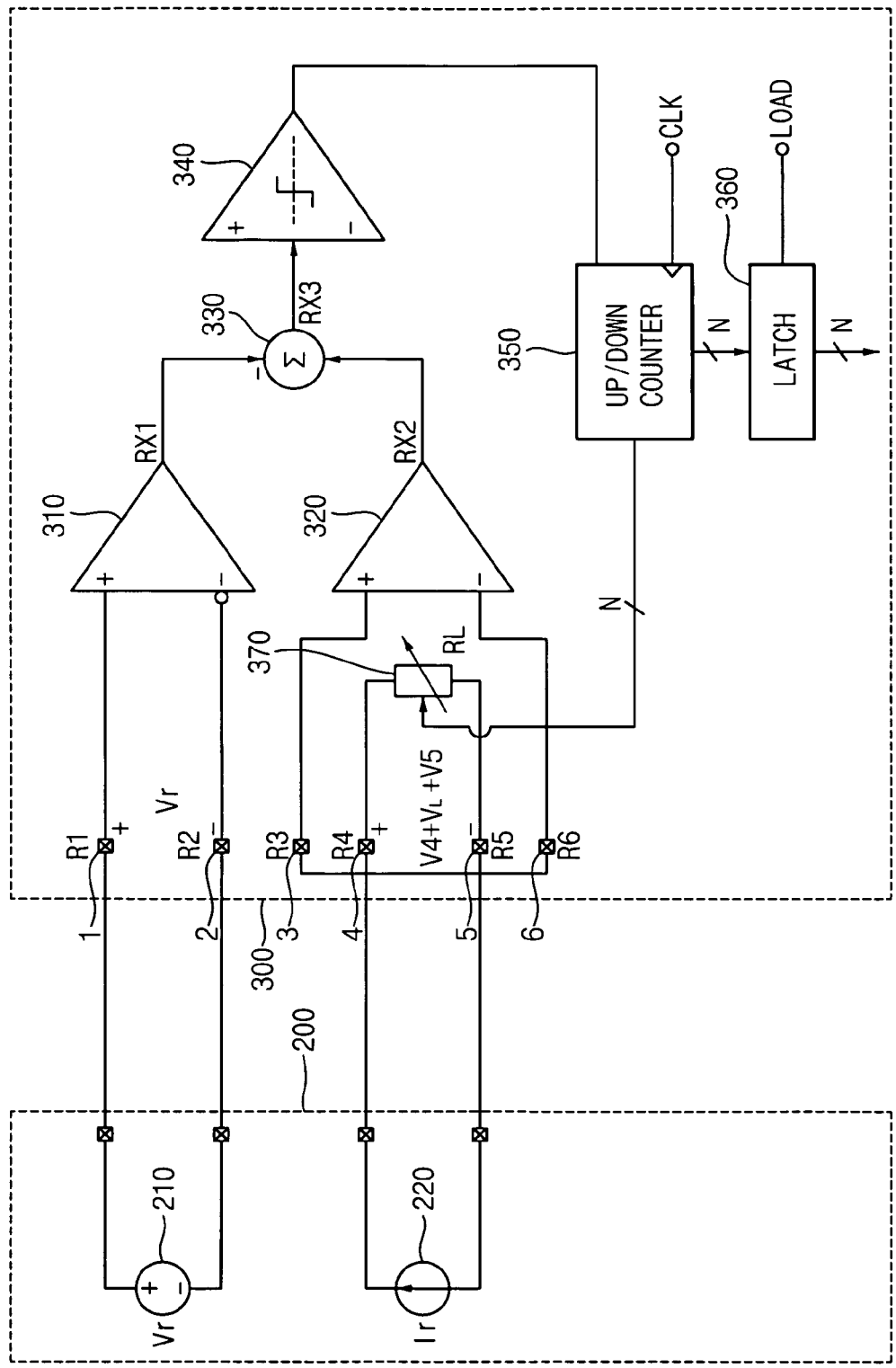
FIG. 5 is a circuit diagram illustrating an LVDS receiver according to further embodiments of the invention.

FIG. 5 is a circuit diagram illustrating an LVDS receiver 300 according to further embodiments of the invention.

In the embodiments illustrated in FIG. 5, an LVDS receiver 300 includes a first receiving unit 310, a second receiving unit 320, a summing unit 330, a comparing unit 340, an up/down counter 350, a latch 360 and a variable termination resistor unit 370, which are similar to the first receiving unit 110, the second receiving unit 120, the summing unit 130, the comparing unit 140, the up/down counter 150, the latch 160 and the variable termination resistor unit 170 of the LVDS receiver 100 shown in FIG. 2, respectively. However, in order to take into account the bump contact resistances of the LVDS receiver 300, the connection of the variable termination resistor unit 370 to the second receiving unit 320 is different from the connection of the variable termination resistor unit 170 to the second receiving unit 120 of the LVDS receiver 100 of FIG. 2.

Referring to FIG. 5, a first pad 1 and a second pad 2 configured to connect the first receiving unit 310 to external contacts have resistances R1 and R2, respectively. Third to sixth pads 3, 4, 5 and 6 configured to connect the second receiving unit 320 and the variable termination resistor unit 370 to external contacts have resistances R3, R4, R5 and R6, respectively.

The resistances R1 and R2, which are on a voltage path though which the reference voltage Vr is transferred to the first receiving unit 310, do not affect the reference voltage Vr. Thus, the resistances R1 and R2 are not considered.

The variable termination resistor unit 370 is on a current path through which a reference current Ir flows from the current source 220, and the second receiving unit 320 is on a voltage path for detecting the voltage across the variable termination resistor unit 370. The pads 4 and 5 of the voltage across the variable termination resistor unit 370 are respectively separated and connected in parallel with the pads 3 and 6 of the second receiving unit 320.

That is, the fourth and the fifth pads 4 and 5 connect the variable termination resistor unit 370 to the outside, and the third and the sixth 3 and 6 connect the second receiving unit 320 to the outside.

The resistances R4 and R5, which are on the current path, affect the voltage $V_L$ across the variable termination resistor unit 370. A voltage V4 across the fourth pad 4 and a voltage V5 across the fifth pad 5 are considered, along with the voltage $V_L$. A voltage detected at the second receiving unit 320 is a total voltage V4+$V_L$+V5, equal to a sum of the voltage V4 across the fourth pad 4, the voltage $V_L$ across the variable termination resistor unit 370, and voltage V5 across the fifth pad 5.

The resistances R3 and R6, which are not on the current path of the reference current Ir, do not affect the voltage $V_L$. The resistances R3 and R6 are not taken into account.

The second receiving unit 320 senses the total voltage V4+VL+V5 applied across the fourth pad 4, the variable termination resistor unit 370, and the fifth pad 5, based on the reference current Ir from the current source 220, and responsively generates the second differential signal RX2.

Accordingly, an LVDS receiver 300 according to some embodiments of the invention may precisely calibrate the termination resistor, taking into account the resistances of the pads, which can be in a range of from several ohms to tens of ohms.

An LVDS receiver according to some embodiments of the invention may include a termination resistor for generating low voltage differential signals inside an integrated chip. The resistance of the termination resistor may be calibrated. An LVDS receiver according to some embodiments of the invention may provide increased signal precision compared to an LVDS receiver using an external termination resistor. An LVDS receiver configured according to some embodiments of the invention may also have advantages in terms of process efficiency and costs.

The foregoing is illustrative of the present invention and is not to be construed as limiting thereof. Although a few exemplary embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A low voltage signal (LVDS) receiver, comprising:
   a first receiving unit configured to receive a reference voltage and to responsively generate a first signal;
   a second receiving unit configured to receive a voltage developed across a variable termination resistor unit having a resistance that is adjustable based on a resistance control code in response to a reference current, and to responsively generate a second signal;
   a comparing unit configured to compare the first signal with the second signal and to responsively generate a counter control signal; and
   an up/down counter configured to adjust the resistance control code in response to the counter control signal and to provide the resistance control code to the variable termination resistor unit.

2. The LVDS receiver of claim 1, wherein the reference voltage has a voltage level approximately equal to a low voltage signal.

3. The LVDS receiver of claim 1, wherein the reference voltage is provided from an external voltage source.

4. The LVDS receiver of claim 1, further comprising a voltage source configured to generate the reference voltage and to provide the reference voltage to the first receiving unit.

5. The LVDS receiver of claim 1, wherein the reference current is substantially equal to a value of the reference voltage divided by a desired resistance value of the variable termination resistor unit.

6. The LVDS receiver of claim 1, wherein the reference current is provided from an external current source.

7. The LVDS receiver of claim 1, further comprising a current source configured to generate the reference current and to provide the reference current to the first receiving unit.

8. The LVDS receiver of claim 1, wherein the first receiving unit, the second receiving unit, the variable termination resistor unit, the comparing unit and the up/down counter are implemented in a single integrated chip.

9. The LVDS receiver of claim 1, further comprising a summing unit configured to combine the first signal and the second signal, configured to responsively generate a third signal containing information of the first and second signals, and configured to provide the third signal to the comparing unit.

10. The LVDS receiver of claim 1, wherein the comparing unit is configured to generate a first counter control signal, in response to the second signal being smaller than the first signal, that controls the up/down counter so that the voltage across the variable termination resistor unit increases, and wherein the comparing unit is further configured to generate a second counter control signal, in response to the second signal being larger than the first signal, that controls the up/down counter so that the voltage across the variable termination resistor unit decreases.

11. The LVDS receiver of claim 10, wherein the counter control signal is configured to decrease the resistance control code in response to the second signal being smaller than the first signal, and the counter control signal is configured to increase the resistance control code in response to the second signal being larger than the first signal.

12. The LVDS receiver of claim 1, wherein the variable termination resistor unit comprises multiple MOS transistors that are coupled in parallel to one another, and that are configured to respectively turn on or off in response to a respective bit of the resistance control code.

13. The LVDS receiver of claim 12, wherein respective ones of the multiple MOS transistors have different effective resistances.

14. The LVDS receiver of claim 1, wherein the variable termination resistor is configured such that its resistance decreases as the resistance control code increases and increases as the resistance control code decreases.

15. The LVDS receiver of claim 1, further comprising a latch configured to store the resistance control code.

16. The LVDS receiver of claim 15, wherein the latch is configured to store the resistance control code when the resistance of the variable termination resistor unit has settled.

17. The LVDS receiver of claim 1, further comprising a first pad and a second pad configured to connect the variable termination resistor unit to an external connector.

18. The LVDS receiver of claim 17, further comprising a third pad and a fourth pad configured to connect the second receiving unit to a second external connector, the third pad and the fourth pad being electrically connected to the first pad and the second pad, respectively.

19. The LVDS receiver of claim 18, wherein the second receiving unit is presented with a total voltage across the variable termination resistor unit, the first pad and the second pad.

20. The LVDS receiver of claim 1, further comprising a fifth pad and a sixth pad configured to connect the first receiving unit with an external connector.

* * * * *